(12) United States Patent
Tanaka et al.

(10) Patent No.: US 11,996,516 B2
(45) Date of Patent: *May 28, 2024

(54) ANODE LAYER AND FLUORIDE ION SECONDARY BATTERY

(71) Applicant: HONDA MOTOR CO., LTD., Tokyo (JP)

(72) Inventors: Akihisa Tanaka, Saitama (JP); Yoshiyuki Morita, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 17/643,187

(22) Filed: Dec. 8, 2021

(65) Prior Publication Data

US 2022/0278363 A1 Sep. 1, 2022

(30) Foreign Application Priority Data

Feb. 26, 2021 (JP) .................................. 2021-030505

(51) Int. Cl.
| | |
|---|---|
| *H01M 10/0562* | (2010.01) |
| *H01M 4/58* | (2010.01) |
| *H01M 4/62* | (2006.01) |
| *H01M 4/02* | (2006.01) |

(52) U.S. Cl.
CPC ....... *H01M 10/0562* (2013.01); *H01M 4/582* (2013.01); *H01M 4/625* (2013.01); *H01M 2004/027* (2013.01); *H01M 2300/0068* (2013.01); *H01M 2300/008* (2013.01)

(58) Field of Classification Search
CPC .. H01M 10/0562; H01M 4/582; H01M 4/625; H01M 2004/027; H01M 2300/0068; H01M 2300/008
See application file for complete search history.

(56) References Cited

U.S. PATENT DOCUMENTS

| | | | |
|---|---|---|---|
| 2017/0346316 A1 | 11/2017 | Nakamoto et al. | |
| 2018/0131038 A1* | 5/2018 | Miki | ...................... C01F 17/36 |
| 2018/0159129 A1* | 6/2018 | Ide | .......................... C01F 17/36 |
| 2019/0006708 A1 | 1/2019 | Komori | |
| 2019/0006709 A1 | 1/2019 | Komori | |
| 2019/0334202 A1 | 10/2019 | Miki | |

FOREIGN PATENT DOCUMENTS

| | | |
|---|---|---|
| CN | 107452957 A | 12/2017 |
| CN | 108075176 A | 5/2018 |
| CN | 108172828 A | 6/2018 |
| CN | 109216780 A | 1/2019 |
| CN | 109216781 A | 1/2019 |
| CN | 110416565 A | 11/2019 |
| CN | 111263994 A | 6/2020 |
| WO | WO-2019042518 A1 * 3/2019 ............. C01F 11/22 |
| WO | 2019187942 A1 10/2019 |

OTHER PUBLICATIONS

Duc Tho Thieu et al., "CuF2 as Reversible Cathode for Fluoride Ion Batteries", Adv. Funct. Mater. 2017, 27, 1701051.
Office Action issued in the CN Patent Application No. 202080024857.0, dated Feb. 11, 2023.
Office Action issued in the related CN Patent Application No. CN202210021117.2, mailed on Mar. 25, 2023.

* cited by examiner

*Primary Examiner* — Milton I Cano
*Assistant Examiner* — Joshua P McClure
(74) *Attorney, Agent, or Firm* — CKC & PARTNERS CO., LLC

(57) ABSTRACT

There is provided an anode layer including an anode active material, a conductive aid, and a solid electrolyte, the anode active material including a lanthanoid fluoride doped with an alkaline earth metal fluoride, the conductive aid including a carbon material, the solid electrolyte including at least one of $BaCaF_4$ and $SrCaF_4$, and the lanthanoid fluoride doped with the alkaline earth metal fluoride and the carbon material forming a complex. There is also provided a fluoride ion secondary battery including the anode layer, an electrolyte, and a cathode layer.

5 Claims, 2 Drawing Sheets

ANODE LAYER AND FLUORIDE ION SECONDARY BATTERY

This application is based on and claims the benefit of priority from Japanese Patent Application No. 2021-030505, filed on 26 Feb. 2021, the content of which is incorporated herein by reference.

BACKGROUND OF THE INVENTION

Field of the Invention

The present invention relates to an anode layer and a fluoride ion secondary battery.

Related Art

Conventionally, a lithium ion secondary battery is widely prevalent as a secondary battery having a high energy density. The lithium ion secondary battery includes a separator disposed between a cathode and an anode and is filled with an electrolytic solution.

The electrolytic solution for the lithium ion secondary battery may have a safety problem against heat because the electrolytic solution usually includes a flammable organic solvent.

Therefore, a fluoride ion secondary battery has been considered as an all-solid battery in which a solid electrolyte layer is disposed between a cathode layer and an anode layer.

A lanthanoid fluoride has been considered to be applied to an anode active material for the fluoride ion secondary battery because of its low defluorination potential.

For example, a fluoride ion secondary battery including a metal lanthanoid sheet as an anode current collector has been known (e.g., see Non-Patent Document 1). In this case, when the fluoride ion secondary battery is discharged, the lanthanoid fluoride is produced on the metal lanthanoid sheet, so that the lanthanoid fluoride serves as the anode active material.

Non-Patent Document 1: Adv. Funct. Mater. 2017, 27, 1701051

SUMMARY OF THE INVENTION

However, there has been a problem that the fluoride ion secondary battery has an insufficient discharge capacity.

An object of the present invention is to provide an anode layer enabling an improved discharge capacity of a fluoride ion secondary battery.

One aspect of the present invention relates to an anode layer including an anode active material, a conductive aid, and a solid electrolyte, the anode active material including a lanthanoid fluoride doped with an alkaline earth metal fluoride, the conductive aid including a carbon material, the solid electrolyte including at least one of $BaCaF_4$ and $SrCaF_4$, and the lanthanoid fluoride doped with the alkaline earth metal fluoride and the carbon material forming a complex.

The lanthanoid fluoride may be one or more compounds selected from the group consisting of $LaF_3$, $CeF_3$, $SmF_3$, and $NdF_3$.

The alkaline earth metal fluoride may be one or more compounds selected from the group consisting of $CaF_2$, $SrF_2$, and $BaF_2$.

The lanthanoid fluoride doped with the alkaline earth metal fluoride may be one or more compounds selected from the group consisting of $La_{0.5}Ba_{0.1}F_{2.9}$, $Ce_{0.95}Ba_{0.05}F_{2.95}$, $Ce_{0.98}Sr_{0.09}F_{2.95}$, and $Ce_{0.95}Ca_{0.05}F_{2.95}$.

The solid electrolyte may include a nanoparticle made of at least one of $BaCaF_4$ and $SrCaF_4$.

Another aspect of the present invention includes the anode layer, an electrolyte, and a cathode layer in the fluoride ion secondary battery.

According to the present invention, an anode layer enabling an improved discharge capacity of a fluoride ion secondary battery can be provided.

DETAILED DESCRIPTION OF THE INVENTION

Figure 1:
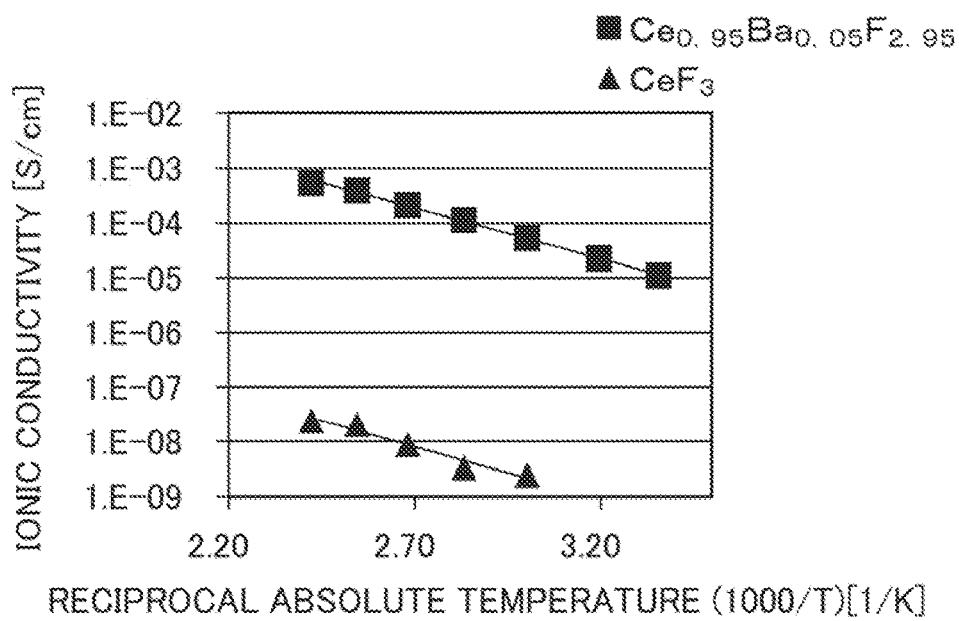
FIG. 1 is a graph showing relationships between ionic conductivities of $Ce_{0.95}Ba_{0.05}F_{2.95}$ and $CeF_3$ and a reciprocal absolute temperature.

Embodiments of the present invention will now be described.

<Anode Layer>

An anode layer of the present embodiment includes an anode active material, & conductive aid, and a solid electrolyte, and is used for a fluoride ion secondary battery. Here, the anode active material Includes a lanthanoid fluoride doped with an alkaline earth metal fluoride, the conductive aid includes a carbon material, and the solid electrolyte includes at least one of $BaCaF_4$ and $SrCaF_4$. Furthermore, the lanthanoid fluoride doped with the alkaline earth metal fluoride and carbon material forms a complex. In other words, the anode layer of the present embodiment includes a complex of the lanthanoid fluoride doped with alkaline earth metal fluoride and the carbon material (hereinafter also referred to as a complex of the lanthanoid fluoride and the carbon material).

The anode layer of the present embodiment has an improved ion conductivity because the anode layer includes the lanthanoid fluoride doped with alkaline earth metal fluoride. Furthermore, the anode layer of the present embodiment has an improved electron conductivity because the anode layer includes the complex of the lanthanoid fluoride and the carbon material. Moreover, the anode layer of the present embodiment has a low defluorination potential because the anode layer includes at least one of $BaCaF_4$ and $SrCaF_4$. Therefore, a discharge capacity is improved when the anode layer of the present embodiment is applied to the all-solid fluoride ion secondary battery.

[Anode Active Material]

The anode active material includes the lanthanoid fluoride doped with the alkaline earth metal fluoride.

The lanthanoid fluoride is not particularly limited. Examples thereof include $LaF_3$, $CeF_3$, $SmF_3$, and $NdF_3$. Two or more thereof may be used in combination.

The alkaline earth metal fluoride to be used for doping the lanthanoid fluoride is not particularly limited, as long as it has an ion conductivity. Examples thereof include $CaF_2$, $SrF_2$, and $BaF_2$. Two or more thereof may be used in combination.

Examples of the lanthanoid fluoride doped with the alkaline earth metal fluoride include $La_{0.5}Ba_{0.1}F_{2.9}$, $Ce_{0.95}Ba_{0.05}F_{2.95}$, $Ce_{0.98}Sr_{0.09}F_{2.95}$, and $Ce_{0.95}Ca_{0.05}F_{2.95}$. Two or more thereof may be used in combination.

The anode active material may further include an additional anode active material other than the lanthanoid fluoride doped with the alkaline earth metal fluoride.

The additional anode active material other than the lanthanoid fluoride doped with the alkaline earth metal fluoride is not particularly limited, as long as it is an anode active material to be used for the fluoride ion secondary battery.

[Conductive Aid]

The conductive, aid includes the carbon material, and the carbon material may be carbon black.

Examples of the carbon black include furnace black, ketjen black, and acetylene black. Two or more thereof may be used in combination. The conductive aid may further include an additional conductive aid other than the carbon material. The additional conductive aid other than the carbon material is not particularly limited, as long as it is a conductive aid to be used for the fluoride ion secondary battery.

[Complex of Lanthanoid Fluoride and Carbon Material]

In the complex of the lanthanoid fluoride and the carbon material, for example, at least a portion of a surface of lanthanoid fluoride particle is coated with the carbon material.

The complex of the lanthanoid fluoride and the carbon material has preferably a particle diameter of 10 μm or less and further preferably 5 μm or less. The complex of the lanthanoid fluoride and the carbon material having the particle diameter of 10 μm or less improves the ion conductivity and the electron conductivity.

A mass ratio of the carbon material to the lanthanoid fluoride doped with the alkaline earth metal fluoride is preferably 3% by mass or more and 20% by mass or less from the viewpoint of a balance between the .ion conductivity and the electron conductivity.

The anode layer of the present embodiment preferably contains 60% by mass or more and 70% by mass or less of the complex of the lanthanoid fluoride and the carbon material. The anode layer of the present embodiment containing 60% by mass or more and 70% by mass or less of the complex of the lanthanoid fluoride and the carbon material has an improved discharge capacity when the anode layer of the present embodiment is applied to the all-solid fluoride ion secondary battery.

[Method for Producing Complex of Lanthanoid Fluoride and Carbon Material]

A method for producing the complex of the lanthanoid fluoride and the carbon material (hereinafter also referred to as complex) includes a first step in which a mixed powder of the lanthanoid fluoride and the alkaline earth metal fluoride is obtained, a second step in which the mixed powder of the lanthanoid fluoride and the alkaline earth metal fluoride is mixed with the carbon material to thereby obtain a complex precursor, and a third step in which the complex precursor is calcined to thereby obtain a complex.

The first step is a step of mixing the lanthanoid fluoride with the alkaline earth metal fluoride to thereby obtain the mixed powder of the lanthanoid fluoride and the alkaline earth metal fluoride. In other words, the mixing of the lanthanoid fluoride with the alkaline earth metal fluoride can shorten a solid phase diffusion distance of elements derived from the lanthanoid fluoride and the alkaline earth metal fluoride during calcining. Furthermore, after calcining, a mixed powder of the lanthanoid fluoride and the alkaline earth metal fluoride in which no crystal structure of lanthanoid fluoride or the alkaline earth metal fluoride remains can be obtained.

A method for mixing the lanthanoid fluoride with the alkaline earth metal fluoride is not particularly limited. Either a dry method or a wet method may be used. For example, these may be mixed with a mortar.

Mote that, conditions under which the lanthanoid fluoride is mixed with the alkaline earth metal fluoride, for example, a temperature, time, etc. may be appropriately set.

Furthermore, the mixed powder of the lanthanoid fluoride and the alkaline earth metal fluoride may be ground in the first step.

The mixed powder of the lanthanoid fluoride and the alkaline earth metal fluoride may be ground with, for example, a ball mill.

The second step is a step of mixing the mixed powder of the lanthanoid fluoride and the alkaline earth metal fluoride obtained in the first step with the carbon material to thereby obtain the complex precursor.

In the method for producing the complex, the second step is performed before the third step to thereby mix the mixed powder of the lanthanoid fluoride and the alkaline earth metal fluoride with the carbon material in advance. Thus, the complex precursor in which the carbon material is disposed on the surface of the mixed powder of the lanthanoid fluoride and the alkaline earth metal fluoride is obtained.

Therefore, the complex precursor is calcined in the third step to thereby obtain a complex in which at least a portion of a surface of lanthanoid fluoride particle doped with alkaline earth metal fluoride is coated with the carbon material.

Furthermore, since the carbon material is disposed on the surface of the mixed powder of the lanthanoid fluoride and the alkaline earth metal fluoride in the second step, the mixed powder of the lanthanoid fluoride and the alkaline earth metal fluoride is inhibited from grain-growing or coarsening due to fusion of particle boundaries in a crystallization process in the third step, resulting in a complex having a particle diameter approximately the same as that of the mixed powder of the lanthanoid fluoride and the alkaline earth metal fluoride.

A method for mixing the mixed powder of the lanthanoid fluoride and the alkaline earth metal fluoride with the carbon material in the second step is not particularly limited. Either a dry method or a wet method may be used. For example, these may be mixed with a mortar.

Note that, when the mixed powder of the lanthanoid fluoride and the alkaline earth metal fluoride is mixed with the carbon material, shearing is preferably applied.

Furthermore, conditions under which the mixed powder of the lanthanoid fluoride and the alkaline earth metal fluoride is mixed with the carbon material, for example, a temperature, time, etc. may be appropriately set.

Moreover, the complex precursor may be ground in the second step.

The complex precursor may be ground with, for example, a ball mill or a mortar.

The third step is a step of calcining the complex precursor obtained in the second step to thereby obtain a complex.

Since the complex precursor in which the carbon material is disposed on the surface of the mixed powder of the lanthanoid fluoride and the alkaline earth metal fluoride is obtained in the second step, the mixed powder of the lanthanoid fluoride and the alkaline earth metal fluoride is inhibited from grain-growing or coarsening due to fusion of particle boundaries in a crystallization process in the third step, resulting in a complex having a particle diameter approximately the same as that of the complex precursor.

Note that, conditions under which the complex precursor is calcined may be appropriately set.

Furthermore, the complex may be ground in the third step. The complex may be ground with, for example, a mortar.

[Solid Electrolyte]

The solid electrolyte includes at least one of $BaCaF_4$ and $SrCaF_4$, and preferably includes a nanoparticle made of at least one of $BaCaF_4$ and $SrCaF_4$. Thus, an ionic conductive path is more easily ensured and the discharge capacity is improved when the anode layer of the present embodiment is applied to the all-solid fluoride ion secondary battery.

A particle diameter of the nanoparticle made of at least one of $BaCaF_4$ and $SrCaF_4$ is, for example, 30 nm or more and 200 nm or less.

A mass ratio of a total amount of $BaCaF_4$ and $SrCaF_4$ to cerium fluoride doped with the alkaline earth metal fluoride is preferably 0.36 or more and 0.92 or less from the viewpoint of a balance between the ion conductivity and the defluorination potential.

The solid electrolyte may further include an additional solid electrolyte other than $BaCaF_4$ and $SrCaF_4$.

The additional solid electrolyte other than $BaCaF_4$ and $SrCaF_4$ is not particularly limited, as long as it is a solid electrolyte to be used for the fluoride ion secondary battery.

<Fluoride Ion Secondary Battery>

The fluoride ion secondary battery of the present embodiment includes the anode layer of the present embodiment, an electrolyte, and a cathode layer.

[Electrolyte]

The electrolyte may be an electrolytic solution, a solid electrolyte, or a gel electrolyte. Furthermore, the solid electrolyte or the gel electrolyte may be organic-based or inorganic-based.

Any of known solid electrolytes may be used as the solid electrolyte. For example, the solid electrolyte included in the anode layer of the present embodiment may be used as the solid electrolyte.

Mote that, when the solid electrolyte is used as the electrolyte, the fluoride ion secondary battery of the present embodiment is an all-solid fluoride ion secondary battery. In the all-solid fluoride ion secondary battery, for example, a cathode current collector, a cathode layer, a solid electrolyte layer, an anode layer, and an anode current collector are sequentially disposed.

[Cathode Layer]

The cathode layer includes, for example, a cathode active material, a solid electrolyte, and a conductive aid. In this case, a cathode layer from which a sufficiently high standard electrode potential relative to that of the anode layer of the present embodiment is obtained is preferably used.

Examples of the cathode active material include Pb, Cu, Sn, Bi, and Ag.

Examples of the solid electrolyte include $PbSnF_4$ and $Ce_{1-x}Ba_xF_{3-x}$.

Examples of the conductive aid include a carbon material, etc.

[Cathode Current, Collector and Anode Current Collector]

Examples of the cathode current collector include a lead sheet and an aluminum foil. Furthermore, examples of the anode current collector include a gold foil, etc.

EXAMPLES

Although Examples of the present invention will be described hereafter, the present invention is not limited to Examples.

Example 1

An all-solid fluoride ion secondary battery was produced as follows. Note that, unless otherwise described, each of the steps mentioned below was performed within a purge-type glove box DBO-1.5B equipped with an argon gas recycle purification system (manufactured by Miwa Manufacturing Co., Ltd.).

[Production of $Ce_{0.95}Ba_{0.05}F_{2.95}$-AB Complex]

(First Step)

First, 8.598 g of $CeF_3$ powder (manufactured by Sigma-Aldrich; purity; 99.99%) and 0.402 g of $BaF_2$ powder (manufactured by Kojundo Chemical Laboratory Co., Ltd.; purity; 99.9%) were weighed and then mixed with an agate mortar and a pestle for 5 to 10 minutes to thereby obtain a $CeF_3$—$BaF_2$ mixed powder.

The $CeF_3$—$BaF_2$ mixed powder and 20 silicon nitride grinding balls each having a diameter of 10 mm (manufactured by Fritsch) were charged into a vessel dedicated to Premium Line PL-7 (manufactured by Fritsch) serving as an 80 cc silicon nitride ball mill pot, and then sealed.

The sealed ball mill pot was taken out of the glove box and then subjected to a grinding treatment with a bail mill. In this case, grinding treatment conditions were as described below.

Number of revolutions: 800 rpm
Griding treatment time: 60 minutes
Number of times of grinding treatment; 40 times
Downtime between grinding treatments: 5 minutes
Reverse rotation: ON The ball mill pot was taken into the glove box and then the $CeF_3$—$BaF_2$ mixed powder was collected from the ball mill pot.

(Second Step)

Using an agate mortar and a pestle, 500 mg of the $CeF_3$—$BaF_2$ mixed powder was mixed with 36 mg of DENKA BLACK (manufactured by Denka Company Limited) serving as acetylene black (AB) to thereby obtain a $Ce_{0.95}Ba_{0.95}$—$F_{2.95}$-AB complex precursor.

The $Ce_{0.95}Ba_{0.05}F_{2.95}$-AB complex precursor, 20 zirconia grinding balls each having a diameter of 10 mm (manufactured by Fritsch), and 20 silicon nitride grinding balls each having a diameter of 10 mm (manufactured by Fritsch) were charged into a vessel dedicated to Premium Line PL-7 (manufactured by Fritsch) serving as an 80 cc silicon nitride ball mill pot, and then sealed.

The sealed ball mill pot was taken out of the glove box and then subjected to a grinding treatment with a ball mill. In this case, grinding treatment conditions were as described below.

Number of revolutions: 800 rpm
Griding treatment time: 60 minutes
Number of times of grinding treatment: 40 times
Downtime between grinding treatments: 5 minutes
Reverse rotation: ON The ball mill pot was taken into the glove box and then the $Ce_{0.95}Ba_{0.05}F_{2.95}$-AB complex precursor was collected from the ball mill pot. The collected $Ce_{0.95}Ba_{0.05}F_{2.95}$-AB complex precursor was ground with an agate mortar and a pestle for 5 to 10 minutes.

(Third Step)

The $Ce_{0.95}Ba_{0.05}F_{2.95}$-AB complex precursor was transferred into an alumina pot and then calcined using a small size electric furnace KSL-1100X (manufactured by MTI) to thereby obtain a $Ce_{0.95}Ba_{0.05}F_{2.95}$-AB complex. In this case, calcining treatment conditions were as described below.

Flow rate of argon gas: 300 cc/min
Heating rate: 184° C./h
Maximum achievable temperature: 1100° C.
Holding time at maximum achievable temperature: 1 hour
Cooling rate: No control
Cooling method: Standing to cool The $Ce_{0.95}Ba_{0.05}F_{2.95}$-AB complex was collected from the alumina pot and then ground with an agate mortar and a pestle for 5 to 10 minutes.

[Production of $BaCaF_4$]

(Premixing)

First, 690 mg of barium fluoride powder (manufactured by Kojundo Chemical Laboratory Co., Ltd.; purity: 99%) and 310 mg of calcium fluoride powder (manufactured by Kojundo Chemical Laboratory Co., Ltd.; purity: 99.9%) were weighed and then premixed with an agate mortar and a pestle for about 1 hour to thereby obtain a $BaF_2$—$CaF_2$ mixed powder.

(Aerosol Process)

A closed powder hopper which was filled with the $BaF_2$—$CaF_2$ mixed powder was taken out of the glove box and then connected to a high frequency induction thermal plasma nanoparticle synthesis device TP-40020NPS (manufactured by JEOL Ltd.).

Argon gas was supplied to a plasma torch and the $BaF_2$—$CaF_2$ mixed powder was melted by thermal plasma to form a $BaF_2$—$CaF_2$ melt, which was then sprayed into a chamber under reduced pressure. The $BaF_2$-$CaF_2$ melt which had been sprayed into the chamber was cooled, formed into nanoparticles, and changed into $BaCaF_4$. Then, $BaCaF_4$ was collected by an exhaust gas filter located downstream of the device. After blocking upstream and downstream of the exhaust gas filter by valves, the exhaust gas filter was taken into the glove box and $BaCaF_4$ was collected.

[Production of Powder Composition for Anode Layer]

First, 536 mg of the $Ce_{0.95}Ba_{0.05}F_{2.95}$-AB complex, 464 mg of $BaCaF_4$, and 40 g of silicon nitride grinding bails each having a diameter of 2 mm (manufactured by Fritsch) were charged into a vessel dedicated to Premium Line PL-7 (manufactured by Fritsch) serving as a 45 cc silicon nitride ball mill pot, and then sealed.

The sealed ball mill pot was taken out of the glove box and then subjected to a grinding treatment with a ball mill. In this case, grinding treatment conditions were as described below.

Number of revolutions: 200 rpm
Griding treatment time: 15 minutes
Number of times of grinding treatment: 10 times
Downtime between grinding treatments: 5 minutes
Reverse rotation: ON The bail mill pot was taken into the glove box and then a powder composition for an anode layer was collected from the ball mill pot.

[Production of Powder for Cathode Layer ($PbSnF_4$-AB complex )]

After mixing 63.7% by mass of lead fluoride powder (manufactured by Kojundo Chemical Laboratory Co., Ltd.), 29.6% by mass of tin fluoride powder (manufactured by Kojundo Chemical Laboratory Co., Ltd.), and 6.7% by mass of acetylene black (manufactured by Denka Company Limited) in a ball mill, the resultant mixture was calcined at 400° C. for 1 hour under an argon atmosphere, resulting in a $PbSnF_4$-AB complex.

[Powder for Solid Electrolyte Layer]

As a powder for a solid electrolyte layer, the $BaCaF_4$ which was used for producing the powder composition for an anode layer was used.

[Production of All-Solid Fluoride Ion Secondary Battery]

A cylindrical pellet cell was produced through powder-compaction by pressing at a pressure of 40 MPa using a tablet molding device. Specifically, a gold foil having a thickness of 20 μm (manufactured by The Nilaco Corporation; purity: 99.99%) serving as an anode current collector, 10 mg of the powder composition for an anode layer, 40 mg of the powder for a solid electrolyte layer, 20 mg of the powder for a cathode layer, a lead sheet having a thickness of 200 μm (manufactured by The Nilaco Corporation; purity: 99.99%) serving as a cathode active material and a cathode current collector, and an aluminum foil having a thickness of 20 μm (manufactured by The Nilaco Corporation; purity: 99+%) serving as a cathode current collector were charged into the tablet molding device in this order, resulting in a pellet cell.

Comparative Example 1

An all-solid fluoride ion secondary battery was produced in the same manner as in Example 1, except that the powder composition for an anode layer was produced as described below.

[Production or Powder Composition for Anode Layer]

First, 500 mg of $CeF_3$ powder (manufactured by Sigma-Aldrich; purity: 99.99%), 36 mg of DENKA BLACK (manufactured by Denka Company Limited) serving as AB, and 40 g of silicon nitride grinding balls each having a diameter of 2 mm (manufactured by Fritsch) were charged into a vessel dedicated to Premium Line PL-7 (manufactured by Fritsch) serving as a 45 cc silicon nitride ball mill pot, and then sealed.

The sealed ball mill pot was taken out of the glove box and then subjected to a grinding treatment with a ball mill. In this case, grinding treatment conditions were as described below.

Number of revolutions: 200 rpm
Griding treatment time: 15 minutes
Number of times of grinding treatment: 10 times
Downtime between grinding treatments: 5 minutes
Reverse rotation: ON The ball mill pot was taken into the glove box and then a powder composition for an anode layer, was collected from the ball mill pot.

[Particle Diameter of Powder]

(Particle Diameter of $Ce_{0.95}Ba_{0.05}F_{2.95}$-AB Complex)

The powder was photographed using the scanning electron microscope SU-6600 (manufactured by Hitachi High-Tech Corporation) and then powders on SEM images of a plurality of visual fields were measured for length, which was determined as a particle diameter.

(Particle Diameter of $BaCaF_4$)

A specific surface area of the powder was measured using the fully automatic specific surface area measuring device Macsorb HM model-1208 (manufactured by Mountech Co., Ltd.) and then a particle diameter was calculated from the specific surface area and a true density of the powder.

As a result, the $Ce_{0.95}Ba_{0.05}F_{2.95}$-AB complex and $BaCaF_4$ had particle diameters of 50 μm and 110 nm, respectively.

[Ionic Conductivity of $Ce_{0.95}Ba_{0.05}F_{2.95}$ $CeF_3$]

A cylindrical pellet cell was produced through powder-compaction by pressing at a pressure of 40 MPa using a tablet molding device. In this case, $Ce_{0.95}Ba_{0.05}F_{2.95}$ or $CeF_3$ was used as an anode active material. Then, ionic conductivities of $Ce_{0.95}Ba_{0.05}F_{2.95}$-AB and $CeF_3$ were measured by an alternating-current impedance method using the impedance analyzer 1255B/1296A (manufactured by Solartron Analytical). Note that, the $Ce_{0.95}Ba_{0.05}F_{2.95}$-AB complex was used as the complex of the anode active material and the conductive aid in Example 1 and, therefore, the ionic conductivity of $Ce_{0.95}Ba_{0.05}F_{2.95}$ was compared with that of $CeF_3$.

FIG. 1 shows a relationship between ionic conductivities of $Ce_{0.95}Ba_{0.05}F_{2.95}$ and $CeF_3$ and a reciprocal absolute temperature.

Furthermore, Table 1 shows measurement results of densities and ionic conductivities at 140° C. of $Ce_{0.95}Ba_{0.05}F_{2.95}$ and $CeF_3$.

TABLE 1

|  | $Ce_{0.95}Ba_{0.05}F_{2.95}$ | $CeF_3$ |
| --- | --- | --- |
| Density [g/cc] | 5.4 | 4.7 |
| Ionic conductivity [S/cm] | $5.4 \times 10^{-4}$ | $2.4 \times 10^{-8}$ |

FIG. 1 and Table 1 demonstrate that $Ce_{0.95}Ba_{0.05}F_{2.95}$ had a higher ionic conductivity than $CeF_3$.

[Charge and Discharge Test]

The all-solid fluoride ion secondary batteries were subjected to a charge and discharge test at a constant-current. Specifically, the charge and discharge test at a constant current was performed using the potentio-galvanostat device SI1287/1255B (manufactured by Solartron Analytical) in vacuum at 140° C. under the following conditions: current during charging and discharging: 0.04 mA, lower limit of voltage: −2.7 v, upper: limit of voltage: −0.5 V, and starting with charging.

Figure 2:
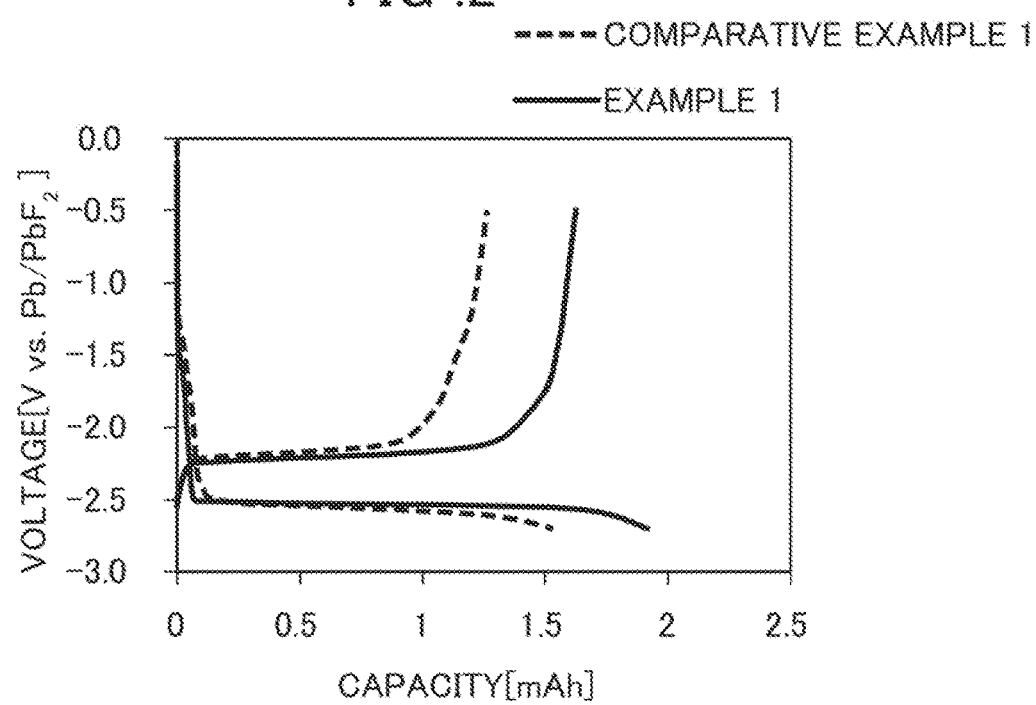
FIG. 2 is a graph showing initial charge and discharge curves of the ail-solid fluoride ion secondary batteries of Example 1 and Comparative Example 1.

FIG. 2 shows initial charge and discharge curves of the all-solid fluoride ion secondary batteries of Example 1 and Comparative Example 1.

FIG. 2 demonstrates that the all-solid fluoride ion secondary battery of Example 1 had a higher charge and discharge capacity than the all-solid fluoride ion secondary battery of Comparative Example 1.

[Cycle Test]

The all-solid fluoride ion secondary batteries were subjected to a cycle test. Specifically, the all-solid fluoride ion secondary batteries were continuously subjected to 5 cycles of the charge and discharge test at a constant current in the same manner as described above.

Figure 3:
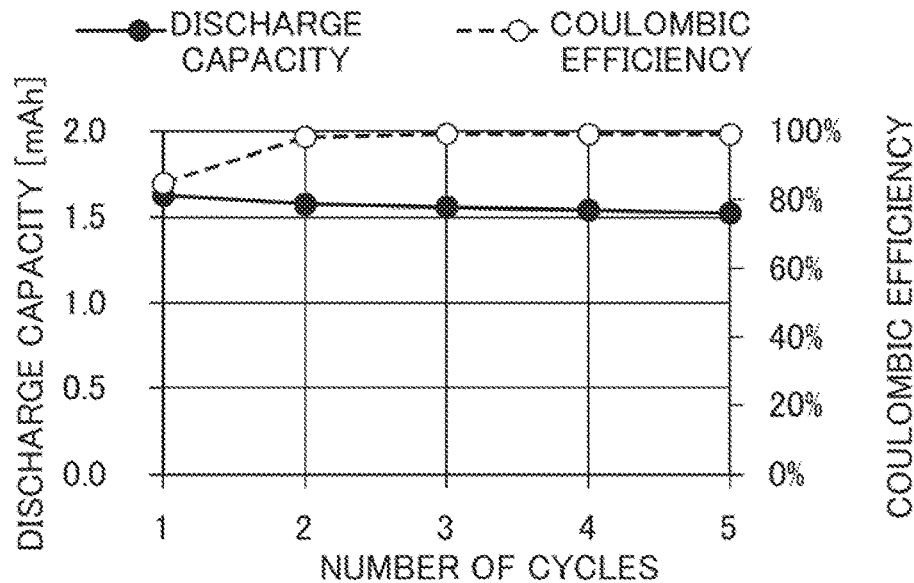
FIG. 3 is a graph showing a cycle characteristic of the all-solid fluoride ion secondary battery of Example 1.
Figure 4:
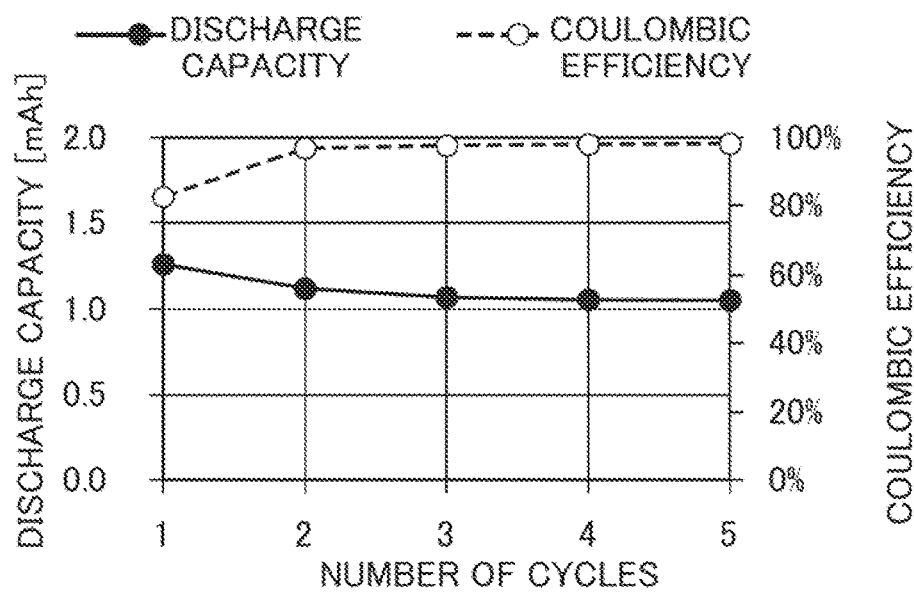
FIG. 4 is a graph showing a cycle characteristic of the all-solid fluoride ion secondary battery of Comparative Example 1.

FIGS. 3 and 4 show cycle characteristics of the all-solid fluoride ion secondary batteries of Example 1 and Comparative Example 1.

FIGS. 3 and 4 demonstrate that the all-solid fluoride ion secondary battery of Example 1 had a higher discharge capacity than the all-solid fluoride ion secondary battery of Comparative Example 1.

What is claimed is:

1. An anode layer comprising:
   an anode active material;
   a conductive aid; and
   a solid electrolyte,
   the anode active material comprising a lanthanoid fluoride doped with an alkaline earth metal fluoride;
   the conductive aid comprising a carbon material;
   the solid electrolyte comprising at least one of $BaCaF_4$ and $SrCaF_4$;
   the alkaline earth metal fluoride being $CaF_2$; $SrF_2$, $BaF_2$; and
   the lanthanoid fluoride doped with the alkaline earth metal fluoride and the carbon material forming a complex.

2. The anode layer according to claim 1, wherein the lanthanoid fluoride is one or more compounds selected from the group consisting of $LaF_3$, $CeF_3$, $SmF_3$, and $NdF_3$.

3. The anode layer according to claim 1 wherein the lanthanoid fluoride doped with the alkaline earth metal fluoride is one or more compounds selected from the group consisting of $La_{0.9}Ba_{0.1}F_{2.9}$, $Ce_{0.95}Ba_{0.05}F_{2.95}$, $Ce_{0.95}Sr_{0.05}F_{2.95}$, and $Ce_{0.95}Ca_{0.05}F_{2.95}$.

4. The anode layer according to claim 1, wherein the solid electrolyte comprises a nanoparticle made of at least one of $BaCaF_4$, and $SrCaF_4$.

5. A fluoride ion secondary battery comprising:
   the anode layer according to claim 1; an electrolyte; and a cathode layer.

* * * * *